P. D. BREWSTER.
PHOTOGRAPHIC CAMERA.
APPLICATION FILED DEC. 16, 1916.
1,284,869.
Patented Nov. 12, 1918.
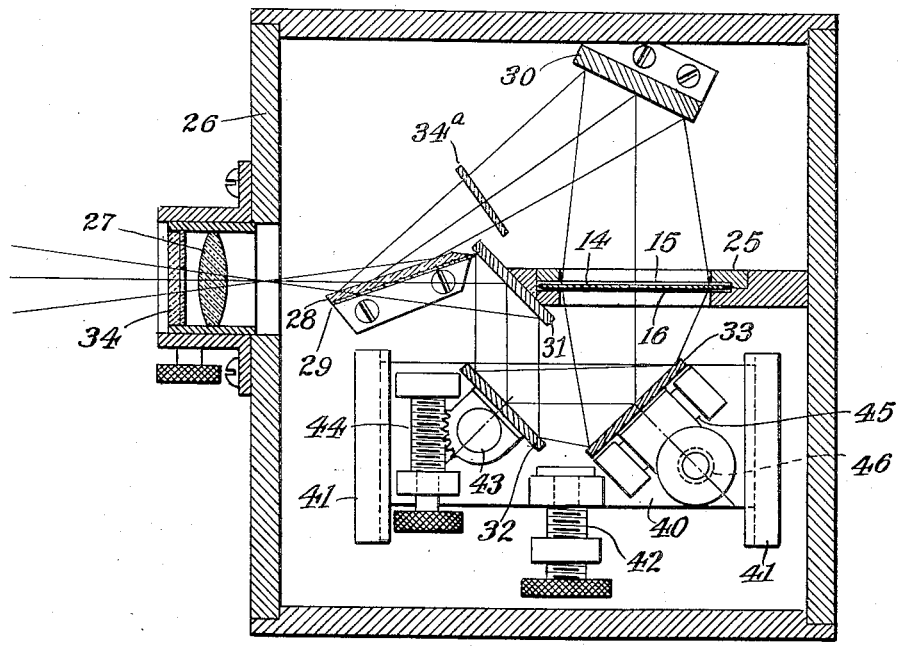
Percy D. Brewster,
Inventor
By his Attorney
Kerr, Page, Cooper & Hayward

UNITED STATES PATENT OFFICE.

PERCY D. BREWSTER, OF EAST ORANGE, NEW JERSEY, ASSIGNOR TO BREWSTER FILM CORPORATION, OF NEWARK, NEW JERSEY, A CORPORATION OF NEW YORK.

PHOTOGRAPHIC CAMERA.

1,284,869.

Specification of Letters Patent.

Patented Nov. 12, 1918.

Original application filed January 29, 1914, Serial No. 815,153. Divided and this application filed December 16, 1916. Serial No. 137,351.

*To all whom it may concern:*

Be it known that I, PERCY D. BREWSTER, a citizen of the United States, residing at East Orange, in the county of Essex and State of New Jersey, have invented certain new and useful Improvements in Photographic Cameras, of which the following is a full, clear, and exact description.

The invention that forms the subject of my present application (a division of my co-pending application Serial No. 815,153, filed January 29, 1914, now Patent No. 1,208,739, dated December 19th, 1916) relates to color photography, particularly cinematography in colors, and its chief object is to provide an improved camera for the purpose, utilizing a film having color-sensitized emulsions or surfaces on both sides, my improved camera being adapted to project two independent optical images of the object to be photographed, one of which images is projected upon one sensitized surface of the film while the other of said images is projected upon the other sensitized surface. Such a film or plate is described in my prior Patents, No. 1,145,968, dated July 13, 1915, and No. 1,191,941, dated July 25, 1916. The image on one side is by preference projected in light predominantly green in color, and the other in light predominantly red. Development and fixation is then effected, converting the two "latent" images into two photographic images which when viewed by transmitted light appear as a single (negative) image.

In the accompanying drawing is shown a sectional plan view of a camera embodying my invention, the illustration being somewhat diagrammatic in character for the sake of simplicity and clearness.

The camera shown comprises a suitable light-tight box or casing 26, having on its front a suitable lens 27. In rear of the lens and of course inside of the casing 26 is a film-gate, shown diagrammatically at 25, through which the film is passed by suitable means. As mechanisms for such purpose are well known in the art, it is unnecessary to illustrate the same here.

The rays from the lens 27 strike a transparent reflector 28 arranged between the lens and the film-gate, said reflector being combined with a ray filter 29 (preferably behind the reflector, as shown), so that part of the light is reflected to a mirror 30 arranged at a suitable angle to the film 14, and thence to the plane occupied by the emulsion 15, forming an image in said plane, and another part, with undesirable rays screened out by the filter 29, is thrown by reflectors 31, 32, 33 to the plane, closely adjacent and parallel to the first-named plane, occupied by the emulsion 16. The light rays received and projected by the lens are thus divided or split into two groups so that two images in suitable register can be formed on opposite sides of the film and in the planes occupied by the emulsions 15, 16, respectively, one image being formed by the light rays of one group and one by the rays of the other group. A filter 34 may be used, say in front of the lens, to cut off or reduce the amount of rays which should not go to either emulsion, and somewhere in the path of the light which strikes the emulsion 15 may be placed a filter, as 34[a], to screen out rays which should not go to that particular emulsion; the corresponding function for emulsion 16 being performed by filter 29, which, as stated, is preferably combined with the light-dividing mirror 28 and arranged at the back thereof.

The reflectors used may be of any suitable material, and if they are silvered glass plates the silvering is preferably on the front surface to eliminate double reflection.

The distances of the reflectors from each other, from the lens, and from the focal plane, and the angles which they make with each other and with the focal plane and the optical axis of the lens, are of course important conditions to the securement of the desired focus of the images and the desired registration thereof. The reflectors may therefore be permanently fixed in their proper positions; or as many as necessary may be adjustable, at least to a certain degree, so that their positions can be corrected at a later stage of manufacture or after the camera is otherwise completed. As indicative of this possibility and to avoid complicating and confusing the drawing only two of the reflectors are shown as adjustable, for example the reflectors 32 and 33. Thus reflector 32 can be swung on the vertical pivot or stem 43 as an axis by means of the screw 44, and reflector 33 can be tilted on the horizontal pivot 45 as an axis by means of a similar screw 46.

From negatives produced by means of the camera herein described, positives can be printed in any convenient way, for example by one or another of the methods explained in my Patent No. 1,208,739, before referred to. In the completed positive the two images are separated by the transparent support on which the two emulsions are coated. If the two images are superposed or congruent throughout and are projected by rays converging through the positive to the projecting lens no oblique or non-axial ray will pass through corresponding points in the two images, and hence on the screen the two projected images will not coincide exactly but one will be larger than the other. In other words, the two images on the screen will not produce a "unitary" image. To avoid this, the image next to the source of the aforesaid converging rays must be larger than the other, though congruent therewith at the center; the difference in size being dependent upon the angularity of the converging rays, as will be readily understood. This condition can be obtained in the negative, so as to permit positive printing by contact, by arranging the film slightly nearer one set of reflectors than the others, or shifting one set of reflectors toward the film. This may, however, impair the focus if the focal length and aperture of the lens be too great. Advantage may also be taken of the fact that rays of different colors are brought to focus at different distances from a non-achromatic lens, the rule being, as is well known, that the higher the color in the spectrum the nearer to the lens is its focal plane. Hence if the corrections of the lens are not such as to produce perfect achromatism but will permit the blue or green image, for example, to be formed nearer the lens than the red or orange image, for instance, adjustment of the film toward one set of reflectors, or vice versa, as explained above, can be made without materially, if at all, impairing the definition of the images. For this purpose the two mirrors 32, 33, are mounted on a slide 40 in guides 41 for sliding adjustment by means of a screw 42.

It is to be understood that the invention is not limited to the precise construction herein specifically described, but can be embodied in other forms without departure from its spirit.

By the term "single lens" in the appended claims I mean one objective lens by which the rays from the object to be photographed are received and projected, in contradistinction to a camera having two lenses as described and claimed in my copending application Serial No. 870,752, filed November 7, 1914, allowed June 16, 1915.

What I claim is:

1. The combination in a photographic camera, of means for supporting in position for exposure two closely adjacent and parallel sensitized surfaces, a single lens to receive light emanating from the object to be photographed, a plurality of reflecting devices between the said lens and the said supporting means to reflect light from said lens and form on the two said sensitive surfaces independent images of the same object, and devices for adjusting at least one of the said reflecting devices.

2. The combination in a photographic camera, of means for supporting in position for exposure two parallel and closely adjacent color-sensitized surfaces, and optical means, including a single lens and a plurality of reflecting devices and at least one ray filter, for projecting on the said color-sensitized surfaces in the said supporting means independent images of the same object, one image in the light of one or more colors of a given color-group and the other image in light of other colors.

3. The combination in a photographic camera, of means for supporting in position for exposure two closely adjacent and parallel sensitized surfaces, and optical means for projecting on the two said sensitized surfaces independent images of the same object centrally congruent but differing in size.

4. The combination in a photographic camera, of means for supporting in position for exposure two parallel and closely adjacent sensitive surfaces, and optical means, including a single lens, for projecting on one of the said surfaces so supported and in one or more colors of a group of colors of the spectrum, the image of the object to be photographed, and upon the other said surface in one or more colors of another color-group an independent image of the same object.

5. The combination in a photographic camera, of means for supporting in position for exposure two parallel and closely adjacent color-sensitized surfaces and optical means including a single lens and a plurality of reflectors and light filters, for projecting on the said color sensitized surfaces in the said supporting means independent images of the same object, one image in light of one or more colors of a given color-group and the other image in light of one or more colors of another color-group.

6. The combination in a photographic camera, of means for supporting in position for exposure two parallel and closely adjacent color-sensitized surfaces, and optical means, including a single lens, for projecting on one of the said surfaces so supported and in light predominantly green in color an image of the object to be photographed and on the other said surface a suitable registering independent image predominantly red in color.

7. In a photographic camera, the combination of means for supporting in position for exposure a film sensitized on both sides, a pair of differently colored light filters, and means, including a single lens, for projecting through one filter and upon one side of the film an image of an object to be photographed and through the other filter and upon the other side of the film an image of the same object in suitable registry with the first-mentioned image.

8. In a photographic camera, in combination, means for supporting in position for exposure a film sensitized on both sides, and optical means, including a single lens and a plurality of reflecting devices, for producing in the two planes occupied by the two sensitized sides of the film dependent optical images of the same object in suitable registry with each other.

9. In a photographic camera, in combination, a single lens for receiving light from an object to be photographed, and a plurality of reflecting devices in rear of said lens to reflect light therefrom into focus at two parallel planes and produce therein two separated images of the object in suitable registry with each.

10. In a photographic camera, in combination, a single lens to receive and project light from an object to be photographed, means for supporting a film in rear of said lens and edgewise thereto, and a plurality of reflecting devices between the lens and said means to reflect the light from the lens into focus at the opposite surfaces of a film in the said means for the production of two independent and separated images of the object in suitable registry with each other.

11. In a photographic camera, in combination, a single lens to receive and project light rays from an object to be photographed, means in rear of the lens to support a sensitized film in position for exposure, and reflecting means, including means between the lens and said supporting means to divide the light rays from the lens into two groups, for directing light rays to the film to form simultaneously thereon two separate images of the object, one by the light of one group of rays and one by the light of the other group.

12. In a photographic camera, in combination, a single lens to receive and project light rays from the object to be photographed, means in rear of the lens to support a sensitized film in position for exposure, a light-dividing device in rear of the lens to receive the light rays projected by the lens and divide the same into two groups, and reflecting devices to receive the two groups of rays and direct the same separately to the film to form simultaneously thereon two images of the object, one by the light of one group of rays and one by the light of the other group.

In testimony whereof I hereunto affix my signature.

PERCY D. BREWSTER.